US009794769B2

(12) United States Patent
Dubesset et al.

(10) Patent No.: US 9,794,769 B2
(45) Date of Patent: Oct. 17, 2017

(54) ENABLING VOICE OVER LONG TERM EVOLUTION (VOLTE) SERVICES FOR NON-VOLTE INBOUND ROAMERS

(71) Applicant: MOBILEUM INC., Santa Clara, CA (US)

(72) Inventors: Laurent Dubesset, Magny les Hameaux (FR); David Gillot, Brussels (BE)

(73) Assignee: MOBILEUM INC., Cupertino, CA (US)

( * ) Notice: Subject to any disclaimer, the term of this patent is extended or adjusted under 35 U.S.C. 154(b) by 33 days.

(21) Appl. No.: 14/781,278

(22) PCT Filed: Mar. 28, 2014

(86) PCT No.: PCT/US2014/032252
§ 371 (c)(1),
(2) Date: Sep. 29, 2015

(87) PCT Pub. No.: WO2014/160978
PCT Pub. Date: Oct. 2, 2014

(65) Prior Publication Data
US 2016/0057607 A1 Feb. 25, 2016

Related U.S. Application Data

(60) Provisional application No. 61/806,623, filed on Mar. 29, 2013.

(51) Int. Cl.
*H04W 8/04* (2009.01)
*H04W 8/12* (2009.01)
(Continued)

(52) U.S. Cl.
CPC ............ *H04W 8/04* (2013.01); *H04L 65/105* (2013.01); *H04L 65/1016* (2013.01);
(Continued)

(58) Field of Classification Search
CPC ....... H04W 8/04; H04W 8/06; H04W 60/005; H04W 12/04; H04W 8/12; H04W 12/06;
(Continued)

(56) References Cited

U.S. PATENT DOCUMENTS 8,369,253 B2 * 2/2013 Faccin .................. H04W 48/18
370/230
9,161,270 B2 * 10/2015 Ore .................... H04W 36/0033
(Continued)

FOREIGN PATENT DOCUMENTS

GB         2 452 688 A      3/2009
WO    WO 2011/044363 A1    4/2011

OTHER PUBLICATIONS

"3rd Generation Partnership Project: Technical Specification Group Services and System Aspects; Study on Circuit Switched (CS) domain services over evolved Packet Switched (PS) access; Stage 2 (Release 9)", 3GPP Standard; No. V9.0.0, pp. 1-60, Mar. 1, 2009.
(Continued)

*Primary Examiner* — Nathan Mitchell
(74) *Attorney, Agent, or Firm* — Arent Fox LLP

(57) ABSTRACT

The present disclosure is directed to a method and system for enabling and facilitating roaming of subscribers of a home public land mobile network (HPLMN) equipped with long term evolution (LTE) devices into a LTE access network of a visited PLMN (VPLMN). Voice over LTE (VoLTE) services are not supported in the HPLMN or the roaming subscribers do not have the VoLTE services. The VPLMN only supports the VoLTE services. Alternatively, the VPLMN supports VoLTE and circuit switched fall back (CSFB) to a Code Division Multiple Access (CDMA) network, but the roaming subscriber's LTE device does not support CSFB to the CDMA network. A non-VoLTE inbound roaming subscriber is registered in a home location register (HLR) as if the roaming subscriber were roaming in
(Continued)

a VPLMN circuit switched domain. A local IMS subscription with telephony services is created and the telephony services are provided to the non-VoLTE inbound roaming subscriber.

25 Claims, 6 Drawing Sheets

(51) Int. Cl.
    *H04W 8/06*     (2009.01)
    *H04W 12/04*     (2009.01)
    *H04W 60/00*     (2009.01)
    *H04L 29/06*     (2006.01)
    *H04W 8/26*     (2009.01)
    *H04W 12/06*     (2009.01)

(52) U.S. Cl.
    CPC ........... *H04L 65/1073* (2013.01); *H04W 8/06* (2013.01); *H04W 8/12* (2013.01); *H04W 12/04* (2013.01); *H04W 60/005* (2013.01); *H04W 8/26* (2013.01); *H04W 12/06* (2013.01)

(58) Field of Classification Search
    CPC .... H04W 8/26; H04L 65/105; H04L 65/1073; H04L 65/1016
    See application file for complete search history.

(56) References Cited

U.S. PATENT DOCUMENTS

| | | | |
|---|---|---|---|
| 9,301,079 B2 * | 3/2016 | Jalkanen | ............... H04W 4/001 |
| 2006/0079236 A1 | 4/2006 | Del Pino et al. | |
| 2009/0270097 A1 | 10/2009 | Gallagher et al. | |
| 2009/0270099 A1 * | 10/2009 | Gallagher | ............... H04W 8/08 455/435.1 |
| 2011/0299682 A1 * | 12/2011 | Hallenstal | ............. H04L 63/061 380/247 |
| 2012/0044908 A1 | 2/2012 | Spinelli et al. | |
| 2013/0150052 A1 * | 6/2013 | Zisimopoulos | ....... H04W 48/18 455/437 |
| 2014/0185521 A1 * | 7/2014 | Aksu | ..................... H04W 4/001 370/328 |
| 2014/0185526 A1 * | 7/2014 | Aksu | ..................... H04W 4/001 370/328 |
| 2014/0269510 A1 * | 9/2014 | Xu | .......................... H04W 8/06 370/328 |
| 2014/0355520 A1 * | 12/2014 | Wallis | ................... H04W 12/06 370/328 |
| 2015/0056986 A1 * | 2/2015 | Kim | ....................... H04W 8/02 455/432.1 |
| 2015/0131526 A1 * | 5/2015 | Noldus | ............... H04L 65/1016 370/328 |
| 2015/0156221 A1 * | 6/2015 | Abtin | ................. H04L 65/1016 370/352 |

OTHER PUBLICATIONS

Sauter, M., "Voice over LTE via Generic Access (VoLGA)", A Whitepaper, pp. 1-16, URL: http://cm-networks.de/volga-a-whitepaper.pdf, Aug. 1, 2009.

Supplementary European Search Report of related European Patent Application No. 14 77 4667 dated Sep. 29, 2016.

International Search Report and Written Opinion of PCT/US2014/032252 dated Sep. 3, 2014.

* cited by examiner

ENABLING VOICE OVER LONG TERM EVOLUTION (VOLTE) SERVICES FOR NON-VOLTE INBOUND ROAMERS

CROSS-REFERENCE TO RELATED APPLICATIONS

The present application is a National Stage entry of International Application No. PCT/US2014/032252, filed Mar. 28, 2014, which is related to and claims priority to U.S. Provisional Patent Application Ser. No. 61/806,623, entitled "Enabling Voice over Long Term Evolution (VoLTE) Services for Non-VoLTE Inbound Roamers" filed Mar. 29, 2013, the entire content of which is incorporated by reference herein.

BACKGROUND

The present disclosure generally relates to telecommunication, more specifically, to a method and system for enabling and facilitating inbound roaming of subscribers equipped with a mobile device such as a Long Term Evolution (LTE) device from a Home Public Land Mobile Network (HPLMN) that has no voice over LTE (VoLTE) services or the HPLMN is not VoLTE capable onto a Visited Public Land Mobile Network (VPLMN) which does not support Circuit Switched Fall Back (CSFB) but has a VoLTE capable network.

As telecommunication technology has progressed, numerous mobile communication standards have been developed. These standards are broadly categorized into second generation (2G), third generation (3G) and fourth generation (4G) technologies. Examples of 2G/3G technologies include Global System for Mobile communications (GSM), General Packet Radio Service (GPRS), Enhanced Data rates for GSM Evolution (EDGE), Universal Mobile Telecommunications System (UMTS), and the like. The UMTS standard further evolved to Evolved Packet System (EPS) under the Third Generation Partnership Project (3GPP). LTE commonly denominates the 3GPP EPS as well as its Evolved-Universal Terrestrial Radio Access. LTE technology offers a wireless broadband system with higher data rates, lower latency, and higher spectrum efficiency, but doesn't provide any telephony services including voice or short message service.

The services such as voice or short message services are provided by two different 3GPP defined solutions. The first one has been designed as an intermediate solution and is called Circuit Switched Fall-Back (CSFB), which requires having a circuit switched network. The second solution is provided through implementing Intelligent Multimedia sub System (IMS) functionality. The GSM Association (GSMA) further defined a profile of IMS for a better inter-operability between Public Land Mobile Networks (PLMNs), which is called Voice over Long Term Evolution (VoLTE).

Some operators have launched a LTE system or network without having a GSM or an UMTS network because they operate a Code Division Multiple Access (CDMA) network or because they are new actors on the market and they only have a LTE license. CDMA network may implement a CDMA based version of CSFB. Green field operators which have only their new networks can only support VoLTE technology to provide voice and short message services under the 3GPP framework.

In essence, CSFB, CSFB CDMA version and VoLTE are not interoperable. Thus, before a wide adoption of GSMA's VoLTE technology by the mobile industry, LTE based VPLMNs that don't support GSM based CSFB implementation will not be able to provide voice services to roaming subscribers from a HPLMN that doesn't support VoLTE nor CDMA based CSFB (GSM is the dominant technology worldwide). As a consequence, those roaming subscribers or roamers will not be able to roam on a VoLTE only VPLMN and the later will lose potential wholesale revenues. Over the last few years, the revenues to network operators have consistently declined due to increased competition, resulting in pricing pressures. On the other hand, LTE subscribers are high average revenue per user (ARPU) roamers that could provide an increase of revenues to both the home and visited operators if LTE roaming is enabled. Hence, providing LTE subscribers access to the LTE radio network has become an important priority for the network operators worldwide.

Hence, there is a need in the art to have a system and method for enabling VoLTE services for non-VoLTE inbound roamers.

SUMMARY

The following presents a simplified summary of one or more aspects in order to provide a basic understanding of such aspects. This summary is not an extensive overview of all contemplated aspects, and is intended to neither identify key or critical elements of all aspects. Its sole purpose is to present some concepts of one or more aspects in a simplified form as a prelude to the more detailed description that is presented later.

In one aspect, the present disclosure is directed to a method and system for enabling Voice over LTE (VoLTE) services for inbound roamers from a Home Public Land Mobile Network (HPLMN) HPLMN that doesn't support VoLTE. At a gateway in a Visited Public Land Mobile Network (VPLMN) of a mobile device of a subscriber, registration of the mobile device from the HPLMN into a Long Term Evolution (LTE) access network of the VPLMN is observed. At the gateway, the location of the mobile device is updated in a Home Register Location (HRL) of the HPLMN and the location of the mobile device corresponds to location information of the gateway. A local Intelligent Multimedia sub-System (IMS) subscription with telephony services is created. In another aspect of the present disclosure, a system is provided for enabling roaming of a mobile device of a subscriber without VoLTE services or from a non-VoLTE capable HPLMN into a LTE access network of a VoLTE capable VPLMN. The system includes a gateway configured to observe registration of the mobile device from the HPLMN into the LTE access network of the VPLMN. The gateway is further configured to update location of the mobile device in a HLR of the HPLMN where the location of the mobile device corresponds to location information of the gateway. The gateway is further configured to create a local IMS subscription with telephony services in a local IMS in the VPLMN.

Another aspect of the present disclosure provides for a computer program product. The computer program product includes a non-transitory computer readable medium comprising code for observing, at a gateway in a visited Public Land Mobile Network (VPLMN) of a mobile device of a subscriber, registration of the mobile device from a home PLMN (HPLMN) into a Long Term Evolution (LTE) access network of the VPLMN, wherein the HPLMN is not capable of providing voice over LTE (VoLTE) services, and the VPLMN provides the VoLTE services over the LTE access network. The non-transitory computer readable medium further comprises code for updating, at the gateway, location information of the mobile device in a home location register (HLR) of the HPLMN, wherein the location of the mobile device corresponds to location information of the gateway in the VPLMN. The non-transitory computer readable medium further comprises code for creating a local Intelligent Multimedia sub-System (IMS) subscription with telephony services in a local IMS of the VPLMN.

BRIEF DESCRIPTION OF DRAWINGS

In the drawings, the same or similar reference numbers identify similar elements or acts.

Further, each of the technical references listed in APPENDIX is incorporated herein by reference in its entirety.

DETAILED DESCRIPTION

In the following description, for purposes of explanation, specific numbers, materials and configurations are set forth in order to provide a thorough understanding of the present disclosure. It will be apparent, however, to one having ordinary skill in the art that the present disclosure may be practiced without these specific details. In some instances, well-known features may be omitted or simplified, so as not to obscure the present disclosure. Furthermore, reference to "one embodiment," "an embodiment," "one example," or "an example" means that a particular feature, structure or characteristic, described in connection with the embodiment or example, is included in at least one embodiment/example of the present disclosure. The appearance of the phrase "in an embodiment," or "in an example" in various places herein does not necessarily refer to the same embodiment/example.

The present disclosure provides a system and a method for facilitating LTE roaming. The general idea of the present technology described herein is to allow a subscriber or mobile device from HPLMN that doesn't support VoLTE to roam on a LTE VPLMN that only support VoLTE. A gateway (e.g., VoLTE4All) provides a local IMS subscription and corresponding telephony service, thereby enabling the interworking between a legacy circuit switched system and a local IMS. The roaming subscriber can make mobile originating calls and send short messages with HPLMN MSISDN of the subscriber as a calling line identity. The roaming subscriber can also receive calls to the HPLMN MSISDN and short messages sent to the HPLMN MSISDN in the LTE VPLMN.

Figure 1:
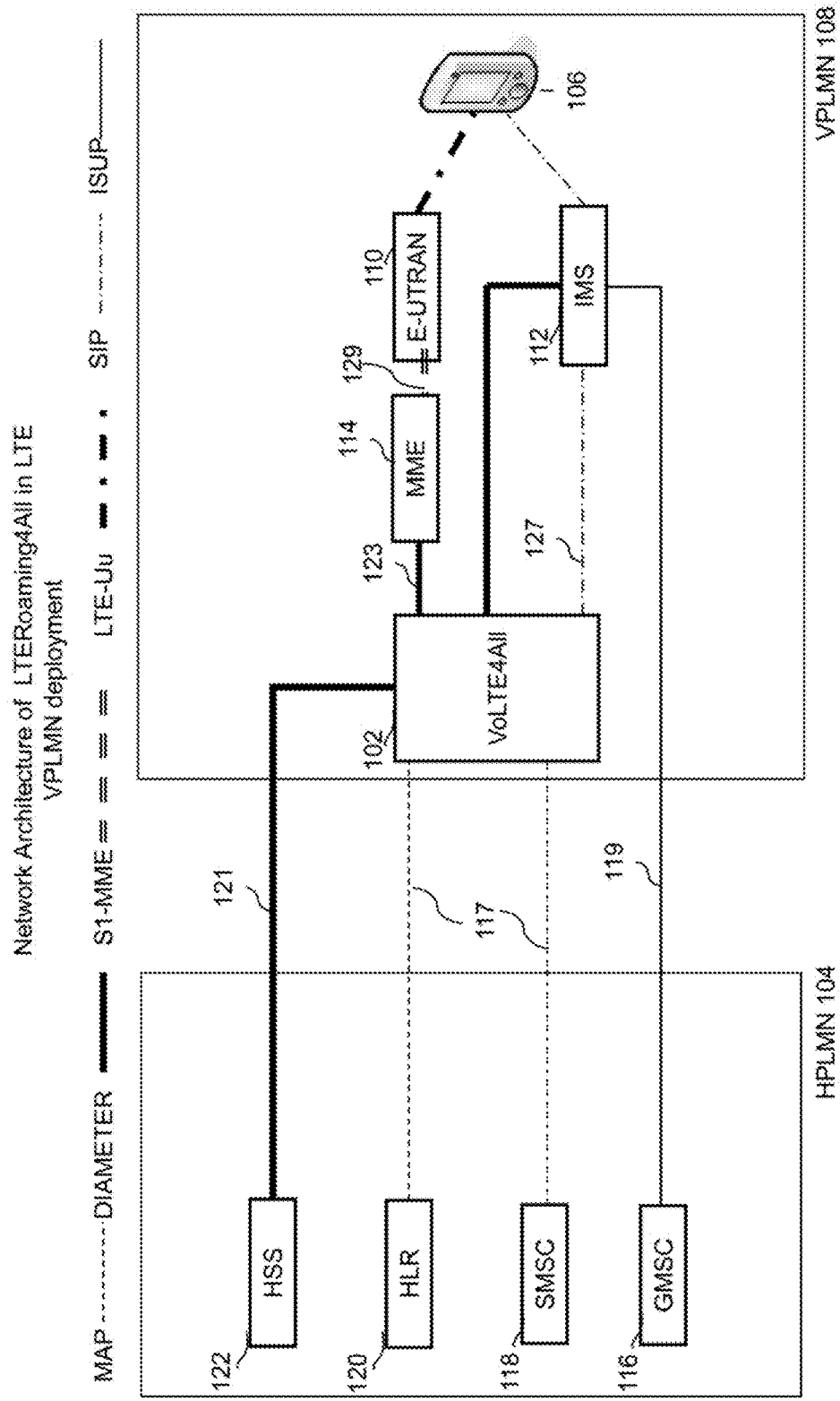
FIG. 1 illustrates a system for providing a local VoLTE service in a VPLMN to a subscriber from a HPLMN that doesn't support VoLTE, in accordance with an aspect of the present disclosure.

FIG. 1 illustrates a system 100 that includes a gateway 102 (e.g., VoLTE4All) in the VPLMN 108, in accordance with an aspect of the present disclosure. The gateway 102 is deployed in the VPLMN 108 to enable inbound roaming of one or more subscribers 106 of the HPLMN 104 equipped with a mobile device such as a LTE device 106, in which the VPLMN 108 only supports VoLTE. This enables the subscriber of HPLMN 104 to register in the VPLMN 108 and to authenticate the subscriber or the mobile device of the subscriber. It also provides the subscriber from the HPLMN 104 with a local IMS subscription with telephony services, such as voice and short message services (SMS) services. As a result, it enables the subscriber to receive calls and short messages to the subscriber's HPLMN Mobile Station International Subscriber Directory Number (MSISDN). Also, the subscriber is enabled to make calls and send short messages.

For the sake of illustration, the system 100 shows certain network elements for interconnecting the HPLMN 104 and the VPLMN 108. The HPLMN 104 includes an home location register (HLR) 120 and a Short Message Service Center (SMSC) 118 which connects over a Signaling System 7(SS7) international network 117 to the gateway 102 in the VPLMN 108. The HPLMN 104 further includes a Gateway MSC (GMSC) 116 that interconnects to an Intelligent Multimedia sub-System (IMS) 112 in the VPLMN 108 via an international Public Switched Telephone Network (PSTN) 119 and an HSS 122 that interconnects to the gateway 102 over an Internet Protocol (IP) eXchange (IPX) network 121. The System 100 further includes in the VPLMN 108 a Mobility Management Entity (MME) 114 that connects to the gateway 102 over a Diameter connection 123, the IMS 112 that connects to the gateway 102 over a Diameter connection 125 and a SIP one 127. The MME 114 further connects to the E-UTRAN 110 over an IP connection 129.

In the example shown in FIG. 1, the gateway 102 (e.g., VoLTE4All) is implement in the VPLMN 108 as part of a network. Alternatively, in an aspect, the gateway 102 may be a separate network element communicating with the VPLMN 108. In another aspect of the present disclosure, the gateway 102 may be implemented at a central location, serving a plurality of VPLMNs. In an aspect of the present disclosure, the gateway 102 may act as a Diameter proxy to observe registration messages of roaming mobile devices such as the mobile device 108 into the LTE access network of the VPLMN 108. In another aspect of the present disclosure, the gateway 102 may probe Diameter connections with the HPLMN 104 to observe registration messages of the roaming mobile devices into the LTE access network of the VPLMN 108.

It will also be apparent to a person skilled in the art that the HPLMN 104 and VPLMN 108 may also include various other network components (not shown in FIG. 1), depending on a particular network architecture under consideration.

Figure 2:
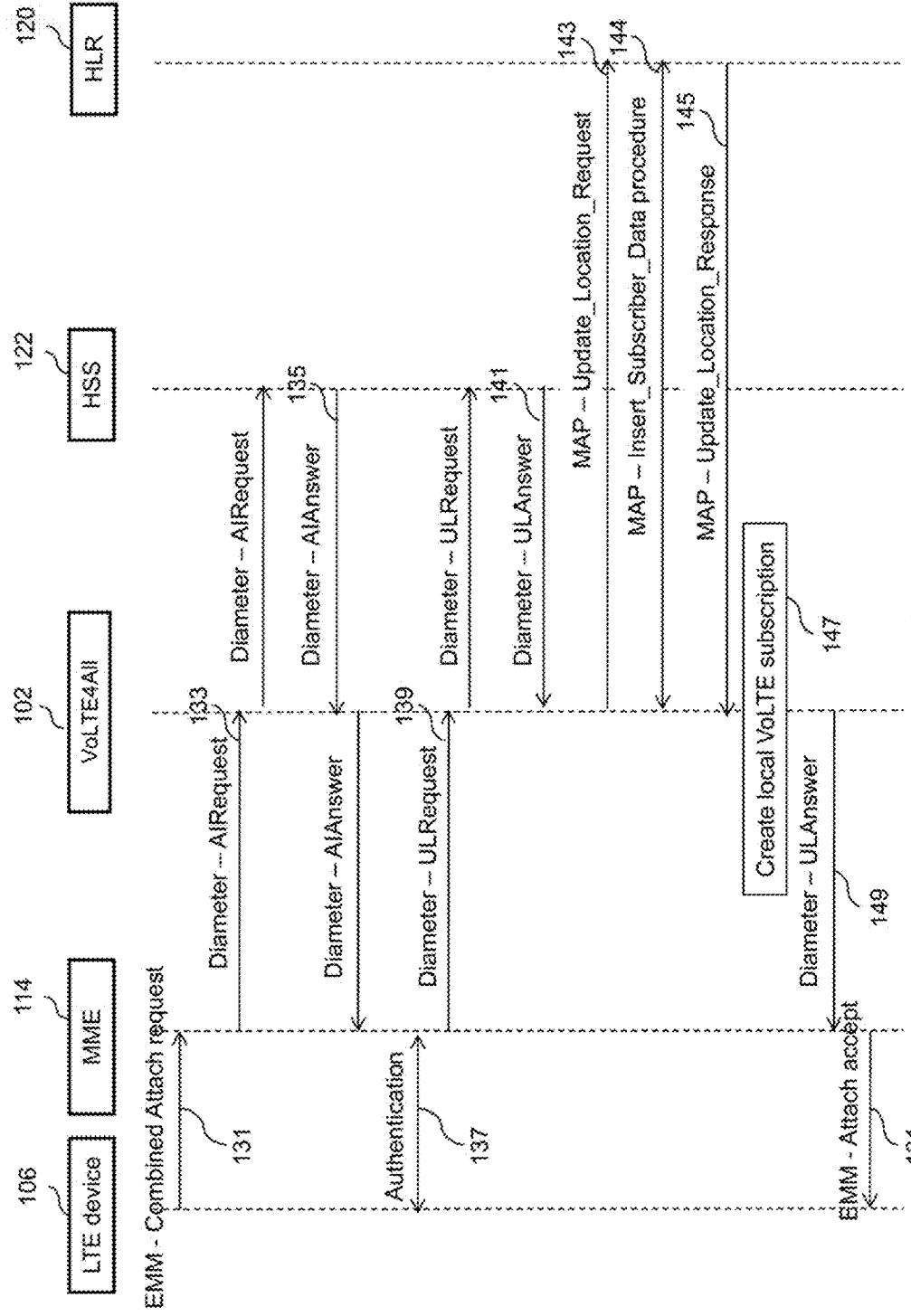
FIG. 2 represents an example of a flow diagram of an EPS ATTACH procedure where a gateway (e.g., VoLTE4All) intercepts Diameter messages over an S6a interface with the HPLMN and performs the registration in a circuit switched domain with the HLR, in accordance with an aspect of the present disclosure.

FIG. 2 represents a flow diagram illustrating how a LTE device 106 registers in the VPLMN 108, which is a LTE network, and how a local IMS subscription is created in accordance with an aspect of the present disclosure. The subscriber's mobile device such as the LTE device 106 sends an Enhanced Mobility Management (EMM) ATTACH request 131 (e.g., EMM-Combined Attach request) to the MME 114 in the VPLMN 108. The MME 114 sends a Diameter Authentication-Information-Request message 133 (e.g., Diameter-AIRequest) to the gateway 102. The gateway 102 routes the Diameter Authentication-Information-Request message 131 onward to the HSS 122 of the HPLMN 104. In response to the Diameter Authentication-Information-Request message 131, the HSS 122 returns back a Diameter Authentication-Information-Answer message 135 (e.g., Diameter-AIAnswer) to the gateway 102 which forwards it to the MME 114. The MME 114 authenticates the subscriber or the mobile device 106 (e.g., LTE device) via an authentication procedure 137.

The MME 114 continues the ATTACH procedure by sending a Diameter Update-Location-Request message 139 (e.g., Diameter-ULRequest) to the gateway 102. The gateway 102 routes it onward to the HSS 122. In response to the Diameter Update-Location-Request message 139, the HSS 122 returns back a Diameter Update-Location-Answer 141 (e.g., Diameter-ULAnswer) to the gateway 102. The gateway 102 starts a circuit switched domain Update Location procedure by sending to the HLR 120 a Mobile Application Part (MAP) Update-Location-Request message 143 (e.g., MAP-Update_Location_Request). Several MAP Insert-Subscriber-Information requests and responses may be exchanged between the gateway 102 and the HLR 120 (e.g., via MAP-Insert_Subscriber_Data procedure 144), carrying all the circuit switched subscription information. Once it is completed, the HLR 120 returns a MAP Update-Location-Response message 145 (e.g., MAP-Update_Location_Response) to the gateway 102. At this point in time, the gateway 102 knows all circuit switched services (e.g., telephony services) of the subscriber from the HPLMN 104 and proceeds with creating a local IMS subscription with the equivalent services including voice and short message services (at 147). The gateway 102 further continues and sends back a Diameter Update-Location-Answer message 149 (e.g., Diameter-ULAnswer 149) to the MME 114. The MME 114 completes the ATTACH procedure by sending an EMM ATTACH accept message 151 (e.g., EMM-Attach accept) to the LTE device 106. Note that in the example, for the sake of simplicity, the session creation procedure is not drawn in FIG. 2.

Figure 3:
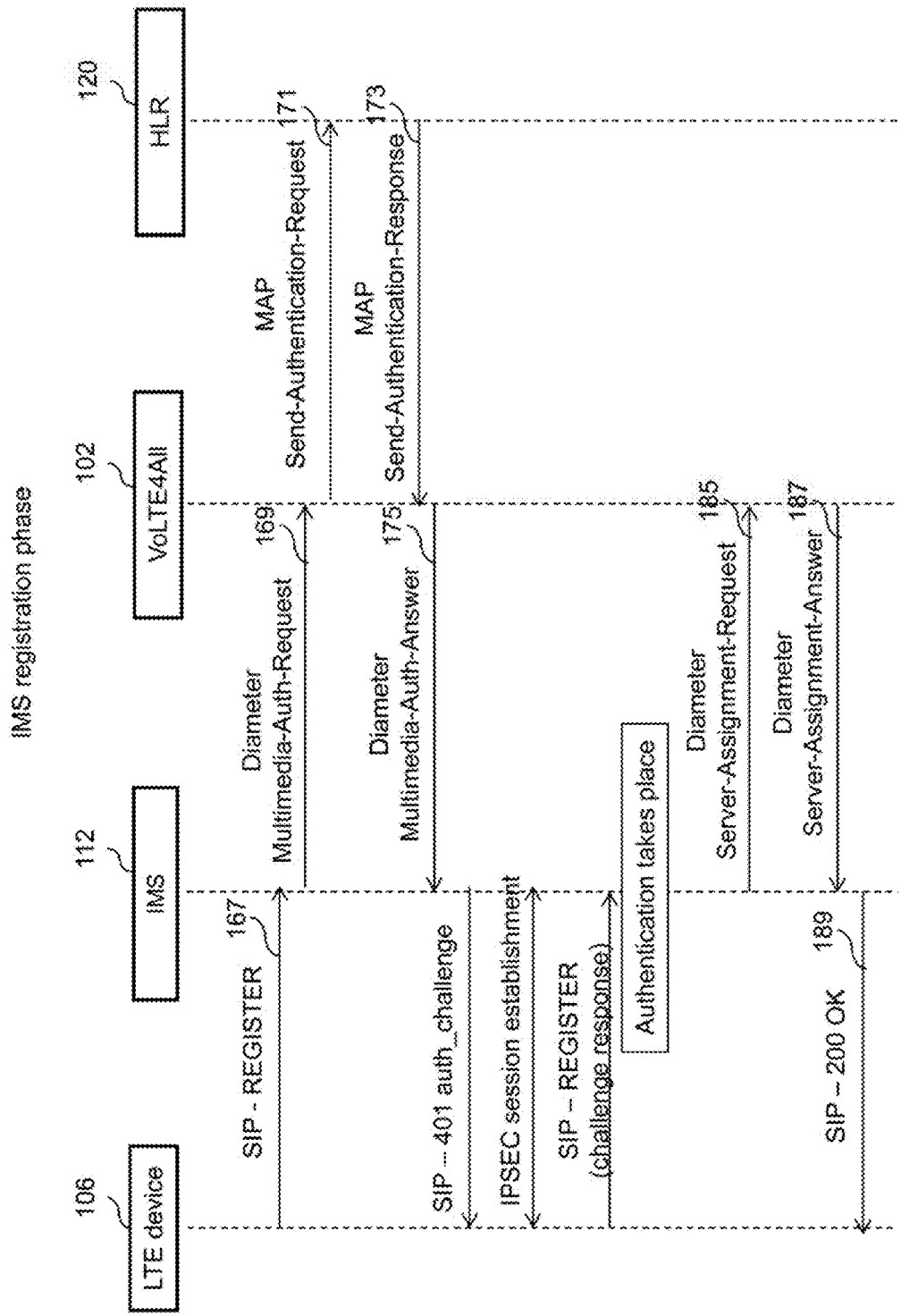
FIG. 3 represents an example of a flow diagram of registration with IMS Authentication and Key Agreement (AKA) of a LTE device in a local IMS, in accordance with an aspect of the present disclosure.

FIG. 3 represents an example of a flow diagram illustrating how the LTE device 106 is registered in the local IMS 112 in accordance with the IMS AKA procedure. The LTE device 106 sends a SIP REGISTER message 167 (e.g., SIP-REGISTER) to the local IMS 112 in the VPLMN 108. The local IMS 112 (e.g., the serving call session control function (S-CSCF)) sends a Diameter Multimedia-Auth-Request message 169 to the gateway 102. The gateway 102 changes the message 169 into a MAP Send-Authentication-Request/Send-Authentication-Information Request message 171 (e.g., MAP Send-Authentication-Request) and forwards the message 171 to the HLR 120. The HLR 120 sends back a MAP Send-Authentication-Response/Send-Authentication-Information Response message 173 (e.g., MAP Send-Authentication-Response) to the gateway 102 with 3G authentication vectors. The gateway 102 changes the message 173 into a Diameter Multimedia-Auth-Answer message 175 (e.g., Diameter Multimedia-Auth-Answer), transforming the 3G authentication vectors and inserting them into the Multimedia-Auth-Answer message 175, and routes them back to the local IMS 112 in response to the Diameter Multimedia-Auth-Request message 169. The local IMS 112 performs authentication of the subscriber from the HPLMN 104 according to the IMS AKA procedure. Once the authentication of the subscriber is done successfully, the local IMS 112 (e.g., S-CSCF) assigns a S-CSCF address in the gateway 102 by sending a Diameter Server-Assignment-Request message 185 (e.g., Diameter Server-Assignment-Request) to the gateway 102. The gateway 102 acknowledges the assignment by sending back a Diameter Server-Assignment-Answer message 187 (e.g., Diameter Server-Assignment-Answer) to the S-CSCF in the local IMS 112. The local IMS 112 sends back a SIP 200 OK message 189 to the LTE device 106 to complete the successful registration procedure.

Figure 4:
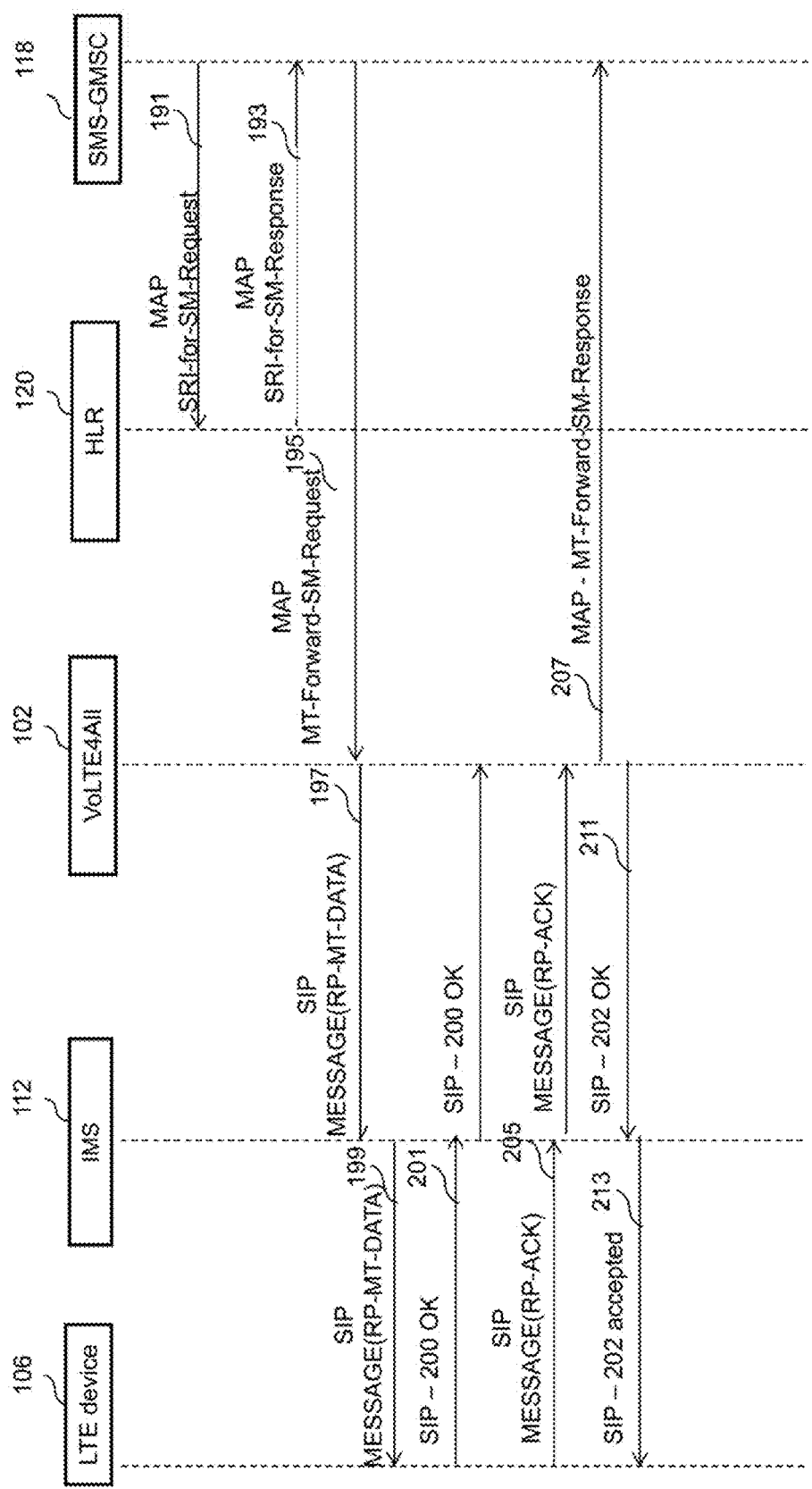
FIG. 4 represents an example of a flow diagram for delivering a Short Message Mobile Terminating to the LTE device in the VPLMN, in accordance with an aspect of the present disclosure.

FIG. 4 represents an example of a flow diagram illustrating how a short message sent to a MSISDN of the subscriber of the LTE device 106 is delivered by the gateway 102 to the LTE device 106 through the local IMS 112 in the VPLMN 108. The Short Message Service-Gateway MSC (SMS-GMSC) 118 sends a MAP SendRoutingInfo-for-SM-Request message 191 (e.g., MAP SRI-for-SM-Request) to the HLR 120. The HLR 120 responds with a MAP SendRoutingInfo-for-SM-Response message 193 (e.g., MAP SRI-for-SM-Response) to the SMS-GMSC 118 with the gateway 102 address. The SMS-GMSC 118 sends a MAP MT-Forward-SM-Request message 195 (e.g., MAP MT-Forward-SM-Request) to the gateway 102. The gateway 102 sends a SIP MESSAGE encapsulating a short message relay layer 197 (e.g., SIP MESSAGE (RP-MT-DATA) to the local IMS 112. The local IMS 112 delivers the SIP MESSAGE 199 to the LTE device 106. The LTE device 106 acknowledges receipt of the SIP MESSAGE 199 with a 200 OK message 201 back to the gateway 102 via the local IMS 112. The LTE device 106 sends a delivery report in a SIP MESSAGE 205 (e.g., SIP MESSAGE (RP-ACK) to the gateway 102 via the local IMS 112. The gateway 102 forwards the delivery report via a MAP MT-Forward-SM-Response message 207 (e.g., MAP-MT-Forward-SM-Response) to the SMS-GMSC 118. The gateway 102 also acknowledges the SIP MESSAGE by sending a SIP-202 OK message 211 to the local IMS 112, which in turn sends a SIP 202 ACCEPTED message 213 to the LTE device 106. As a result, one or more short messages sent to the home PLMN MSISDN can be sent to the mobile device of the roaming subscriber when the mobile device/subscriber is roaming in the VPLMN 108.

Figure 5:
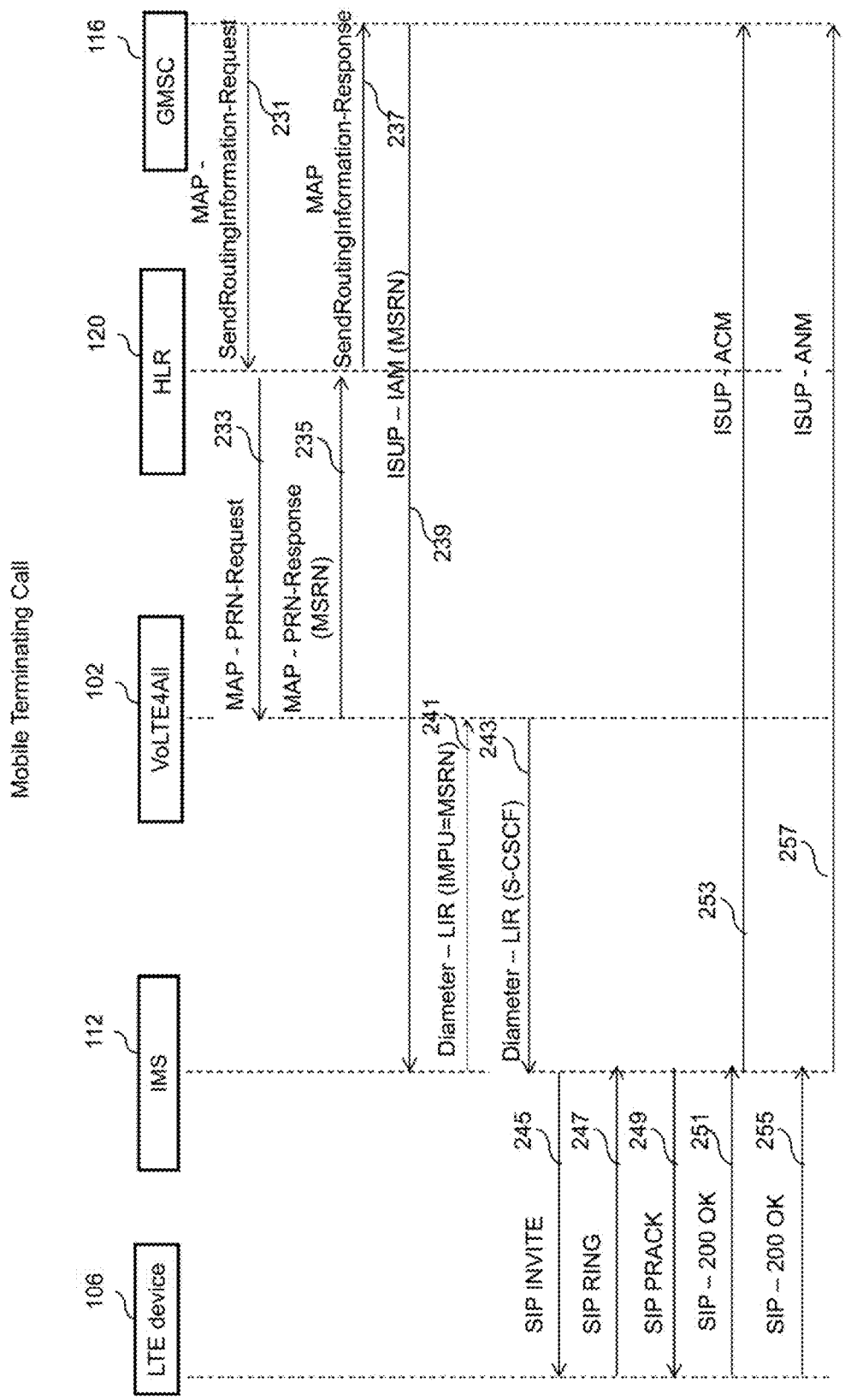
FIG. 5 represents an example of a flow diagram for terminating a call to the LTE device in the VPLMN, in accordance with an aspect of the present disclosure.

FIG. 5 represents an example of a flow diagram illustrating how a voice call terminating to the MSISDN of the subscriber of the LTE device 106 from the HPLMN 104 is routed by the gateway 102 to the LTE device 106 through the local IMS 112 in the VPLMN 108. The GMSC 116 sends a MAP SendRoutingInfo-Request message 231 (e.g., MAP-SendRoutingInformation-Request) to the HLR 120. The HLR 120 sends a MAP Provide-Roaming-Number-Request message 233 (e.g., MAP-PRN-Request) to the gateway 102 to get a Mobile Subscriber Roaming Number (MSRN) for the subscriber of the LTE device 106. The gateway 102 sends back a Provide-Roaming-Number-Response message (e.g., MAP-PRN-Response) 235 with a MSRN that belongs to a pool of E.164 numbers allocated to the VPLMN 108. The gateway 102 has provisioned this number to one of the local IMS subscription public identities.

The HLR 120 responds with a MAP SendRoutingInfo-Response message 237 (e.g., MAP SendRoutingInformation-Response) to the GMSC 116 with the MSRN. The GMSC 116 routes the mobile terminating call to the PSTN gateway in the local IMS 112 via an ISUP message 239 (e.g., ISUP-IAM (MSRN)). The I-CSCF in the local IMS 112 queries the gateway 102 with a Diameter Location-Info-Request message 241 (e.g., Diameter-LIR (IMPU=MSRN) to retrieve the assigned S-CSCF in the local IMS 112. The gateway 102 sends back the S-CSCF address to the I-CSCF in the local IMS 112 via a Diameter LIR message 243 (e.g., Diameter-LIR (S-CSCF)). The Local IMS 112 sends a SIP INVITE message 245 (e.g., SIP INVITE) to the LTE device 106 which rings and sends back a SIP RING message 247 (e.g., SIP RING) to the local IMS 112. The local IMS 112 sends a SIP PRACK message 249 to the LTE device 106. The LTE device 106 acknowledges the SIP PRACK message with a SIP 200 OK message 249 (e.g., SIP-200 OK). The local IMS 112 sends an ISUP ACM message 253 (e.g., ISUP-ACM) back to the GMSC 116. The subscriber of the LTE device 106 answers the mobile terminating call and the LTE device 106 sends a SIP 200 OK message 255 (e.g., SIP-200 OK) to the local IMS 112. The local IMS 112 sends an ISUP ANM message 257 (e.g., ISUP-ANM) to the GMSC 116, establishing the mobile terminating call with the calling party. Thus, a mobile terminating call to the HPLMN MSISDN can be routed to the mobile device of the roaming subscriber when the mobile device/subscriber is roaming in the VPLMN 108.

As a result, the present technology based on various aspects of the gateway 102 enables LTE roaming of subscribers equipped with a LTE devices onto VoLTE capable VPLMNs even though the HPLMN of the roaming subscribers doesn't support VoLTE or even though the subscribers have no VoLTE services.

In the example, the LTE device 106 may be VoLTE capable or be provided with a VoLTE client, which may be downloaded by the subscriber before roaming in another network. In another aspect of the present disclosure, the VoLTE client may be downloaded when the subscriber is roaming in the VPLMN.

In the example described herein, the present disclosure is described as being deployed in a VPLMN, but it will be apparent to persons with normal skill in the art that the present disclosure can also be implemented for multiple VPLMNs and deployed at a central place including but not limited to a roaming hub provider. In another aspect of the disclosure, the subscriber or customer may be roaming at a visited network within the subscriber's home country. In one aspect of the present disclosure, the subscriber may not be roaming, but the subscriber is in the HPLMN. For sake of clarity, the present disclosure may be explained with international roaming scenario; however, it will be apparent to a person skilled in the art that the present disclosure will be equally applicable to all roaming and non-roaming scenarios.

Further, the present disclosure allows LTE roaming of subscribers from a non-VoLTE HPLMN onto a VoLTE only VPLMN by creating a local VoLTE subscription within the VPLMN and by performing the registration of the roaming subscriber into the local IMS network. The subscriber of the HPLMN benefits from telephony services provided by the local IMS network. The telephony services include voice calls, short message, Unstructured Supplementary Service Data (USSD) and prepaid services. The roaming subscriber can make mobile originating calls and send short messages with his or her HPLMN MSISDN as the identity of the originating party. The roaming subscriber can also receive calls when roaming in the VPLMN to its HPLMN MSISDN and short messages sent to its HPLMN MSISDN. The present disclosure also enables the roaming subscriber to receive calls and short messages to the HPLMN MSISDN of the roaming subscriber when roaming in the VPLMN. In an aspect of the present disclosure, the gateway creates a local VoLTE subscription during the EPS registration process. The gateway observes the Diameter Authentication-Information procedure and the Update-Location exchange messages over a S6a interface between the MME and the HSS. The present disclosure is illustrated with the gateway (such as VoLTE4All 102) being in the Diameter path acting as a Diameter proxy. In another aspect of the disclosure, the Diameter procedure can be observed with passive probes over the S6a interface. If the Diameter Update Location procedure is successful, the gateway updates the location of the roaming subscriber into the HLR as if the roaming subscriber were roaming in a circuit switched domain of the VPLMN.

The gateway acts as a VLR and interacts with the HLR over the MAP C interface. In an aspect of the disclosure, the gateway creates a local subscription by mapping the circuit switched service information received in the MAP Insert-Subscriber-Data into IMS telephony subscription information. In another aspect, the subscription information is configured in the gateway.

In certain aspects of the present disclosure, the gateway performs the registration of the roaming subscriber from the HPLMN within the local IMS of the VPLMN. The gateway behaves as the IMS HSS for roaming subscribers and is interconnected with the I-CSCF, the P-CSCF and the S-CSCF of the local IMS over the Diameter Cx interface. In an aspect of the present disclosure, the inbound subscriber is authenticated according to IMS AKA. The gateway receives the Diameter Multimedia-Auth-Request and changes it into a MAP Send-Authentication-Information-Request before sending it to the subscriber's HLR. The gateway receives the 3G authentication vectors from the HLR in a MAP Send-Authentication-Information-Response and provides them to the local IMS in a Diameter Multimedia-Auth-Answer. In another aspect of the present disclosure, the roaming subscriber may be authenticated with other methods like SIP DIGEST.

The gateway implicitly registers two IMS public identities in the local IMS. The first identity (e.g., a first public IMS identity) is a telephony Uniform Resource Identifier (URI), in which the digits of the telephony URI correspond to those of the HPLMN MSISDN. That is, the digits of the first public IMS identity comprise those of a HPLMN MSISDN. The second identity (e.g., a second public IMS identity) is also a telephony URI, in which the digits correspond to those of a number selected from a pool of E.164 numbers allocated to the VPLMN. That is, the digits of the second public IMS identity comprise those of a E.164 telephone number selected from a number range allocated to the VPLMN.

In an aspect of the present disclosure, the gateway enables delivery of one or more short messages to the roaming subscriber in the VPLMN, in which the destination of the one or more short messages is the HPLMN MSISDN. As the HLR recorded a gateway global title as the VMSC one when the gateway updated location of the roaming subscriber in a circuit switched domain, MAP MT-Forward-SM-Request messages may be sent by the SMS-GMSC to the gateway. The gateway behaves as a MSC on the MAP E interface with the SMS-GMSC and as an IP-SM-GW on the ISC interface with the local IMS. The gateway delivers the one or more short messages to the LTE device according to the standard IMS procedure.

In an aspect of the present disclosure, the gateway enables reception of mobile terminating calls to the roaming subscriber in the VPLMN, in which the destination of the mobile terminating call is the HPLMN MSISDN. As the HLR recorded the gateway as being the VLR when the gateway updated the location of the roaming subscriber in the circuit switched domain, MAP Provide-Roaming-Number-Request messages may be sent by the HLR to the gateway. The gateway behaves as a VLR on the MAP D interface with the HLR and provides back to the HLR the Mobile Subscriber Roaming Number in the MAP Provide- Roaming-Number-Response message. The MSRN contains the digits of the telephony URI registered as one of the roaming subscriber's IMS public identity of the local subscription. The MSRN may belong to a pool of E.164 number allocated to the VPLMN. So the GMSC in the HPLMN routes the mobile terminating call to the IMS network PSTN gateway in the VPLMN. The call is then routed to the LTE device in the VPLMN according to the standard IMS procedure for call routing of PSTN (ISUP) initiated call to an IMS subscriber. During this procedure, the gateway behaves as a standard IMS HSS.

Figure 6:
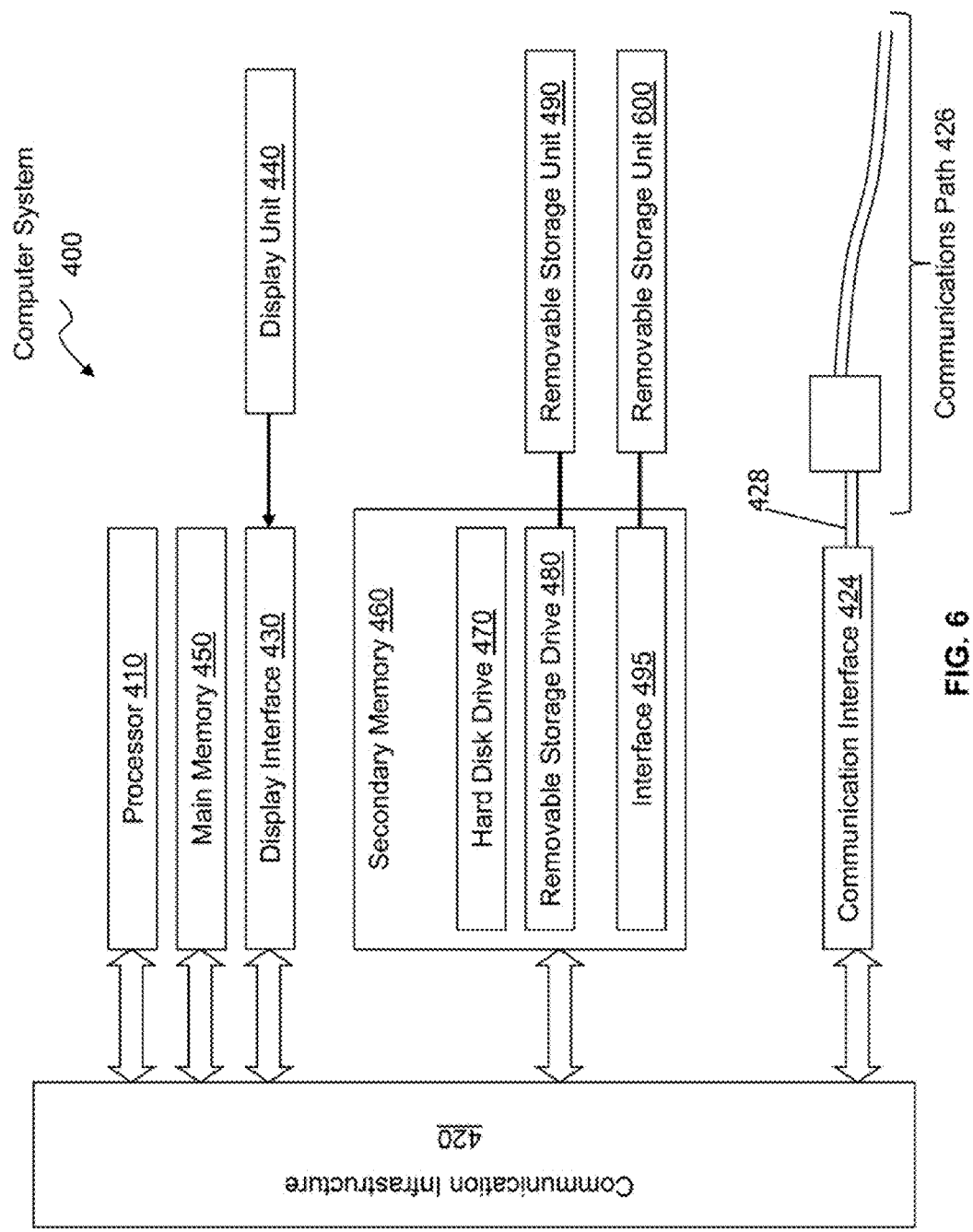
FIG. 6 is a diagram of conceptually illustrating an example computer system capable of carrying out functionality described in example implementations in accordance with certain aspects of the present disclosure.

Various aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein (e.g., functionalities relating to the gateway 102, IMS 112, HLR 120, LTE device 106, MME 114, the HSS 122, etc.). An example of such a computer system 400 is shown in FIG. 6. The computer system 400 may be implemented as either a client or a server in a client-server environment.

The computer system 400 includes one or more processors, such as a processor 410. The processor 410 is coupled to a communication infrastructure 420 (e.g., a communications bus, cross-over bar, or network). For illustration purposes, various software aspects are described in terms of this example computer system. After reading this description, it will become apparent to a person skilled in the relevant art(s) how to implement aspects hereof using other computer systems and/or architectures.

The computer system 400 may include a display interface 430 that forwards graphics, text, and other data from the communication infrastructure 420 (or from a frame buffer not shown) for display on a display unit 440 comprising a display and/or user interface elements (not shown). The computer system 400 may include a main memory 450, preferably random access memory (RAM), and may also include a secondary memory 460. The secondary memory 460 may include, for example, a hard disk drive 470 and/or a removable storage drive 480, representing a floppy disk drive, a magnetic tape drive, an optical disk drive, etc. The removable storage drive 480 may read from and/or write to a removable storage unit 490 in a well-known manner. The removable storage unit 490 may include a floppy disk, magnetic tape, optical disk, etc., which may be read by and written to the removable storage drive 480. As will be appreciated, the removable storage unit 490 may include a non-transitory machine readable or usable storage medium having stored therein computer software and/or data.

Alternative aspects of the present disclosure may include the secondary memory 460 and may include other similar devices for allowing one or more computer programs or other instructions to be loaded into the computer system 400. Such devices may include, for example, a removable storage unit 490 and an interface 495. Examples of such devices may include a program cartridge and cartridge interface (such as that found in video game devices), a removable memory chip (such as an erasable programmable read only memory (EPROM), or programmable read only memory (PROM)) and associated socket, and other removable storage units 490 and interfaces 495, which allow software and/or data to be transferred from the removable storage unit 490 to the computer system 400.

The computer system 400 may also include a communications interface 424. The communications interface 424 may allow software and/or data to be transferred among the computer system 400 and one or more external devices. Examples of the communications interface 424 may include a modem, a network interface (such as an Ethernet card), a communications port, a Personal Computer Memory Card International Association (PCMCIA) slot and card, etc. Software and/or data transferred via the communications interface 424 may be in the form of signals 428 which may be electronic, electromagnetic, optical or other types of signals capable of being received or transmitted by the communications interface 424. These signals 428 may be provided to the communications interface 424 via a communications path (e.g., channel) 426. This communication path 426 may carry signals 428 and may be implemented using both wired and wireless technologies including wire or cable, fiber optics, a telephone line, a cellular link, a radio frequency (RF) link and/or other types of communications channels. As used herein, the terms "computer program medium" and "computer usable/readable medium" refer generally to a non-transitory machine readable storage medium, such as a removable storage drive 480, a hard disk installed in a hard disk drive 470, and/or signals 428. Computer program products comprising a non-transitory machine readable storage medium may provide software to the computer system 400. Examples of a non-transitory computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and Digital Versatile Disk (DVD). Certain aspects of the present disclosure are directed to such computer program products.

Computer programs or software (also referred to as computer control logic) may be stored in the main memory 450 and/or secondary memory 460. Computer programs may also be received via the one or more communications interfaces 424. Such computer programs, when executed by the one or more processors 410, may enable the computer system 400 to perform various operations in accordance with certain aspects of the present disclosure, as discussed herein. In particular, the computer programs, when executed, may enable the one or more processors 410 to perform the various operations including disclosed features in accordance with certain aspects of the present disclosure. Accordingly, such computer programs may represent controllers of the computer system 400.

Where certain aspects of the present disclosure may be implemented using software, the software may be stored in a computer program product and loaded into the computer system 400 using the removable storage drive 480, hard disk drive 470, interfaces 495, or communications interface 424. The control logic (software), when executed by the one or more processors 410, may cause the one or more processors 410 to perform the various operations including certain functions described herein. In another aspect of the present disclosure, the system may be implemented primarily in hardware using, for example, hardware components, such as application specific integrated circuits (ASICs). Implementation of the hardware state machine so as to perform the functions described herein will be apparent to persons skilled in the relevant art(s).

In yet another variation, aspects of the present disclosure may be implemented using a combination of both hardware and software. Further, various illustrative logical blocks, modules, circuits, flowcharts, and algorithm steps described herein may be implemented as electronic hardware (including digital circuitry), computer software, or any combination thereof. For illustrative purposes, various components, blocks, modules, circuits, and steps have been described herein generally in terms of their functionality. The functionality described herein can be implemented in various ways for each particular application. For example, the various logical blocks, modules, and circuits described in connection with the present disclosure may be implemented in part or whole, or performed with a general purpose processor, a digital signal processor (DSP), an application specific integrated circuit (ASIC), a field programmable gate array (FPGA), logic arrays, programmable logic device, discrete gate or transistor logic, discrete hardware components, or any combination thereof. A general purpose processor may be a microprocessor, controller, microcontroller, state machine, etc. A processor may also be implemented as a combination of computing devices, a plurality of microprocessors, one or more microprocessors in conjunction with a DSP core, a combination of a DSP and a microprocessor, or any other combination of logic gates.

As noted and as well known in the data processing and communications arts, a general purpose computer typically comprises a central processor or other processing device, an internal communication bus, various types of memory or storage media (RAM, ROM, EEPROM, cache memory, disk drives, etc.) for code and data storage, one or more network interface cards or ports for communication purposes. The software functionalities involve programming, including executable code as well as associated stored data, e.g., files used for implementing various operations including operations or functionalities described herein in accordance with the present disclosure. The software code may relate to a client or a server or network element functions and may be executable by the general purpose computer. In operation, as noted above, the code is stored in a non-transitory machine readable storage medium within a general purpose computer platform. However, at other times, the software may be stored at other locations and/or transported for loading into an appropriate general purpose computer system for execution. Software code for applications or other programming relating to operations and/or functionalities disclosed herein may also be stored in a server and transmitted through a network for storage in memories of a client.

As noted above, various components of the present apparatus or system described above may include any combination of computing components and devices operating together. The various components of the present system can also be components or subsystems within a larger computer system or network. Further, the components of the present apparatus can also be coupled with any number of other components (not shown), such as other buses, controllers, memory devices, and data input/output devices, in any number of combinations. In addition, any number or combination of other processor-based components may be configured to perform various aspects or functionalities of the present disclosure.

Further, it should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but may not be limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, it covers all of the following interpretations: any of the items in the list, all of the items in the list and any combination of the items in the list.

The above description of illustrated examples of the present disclosure is not intended to be exhaustive or to limit the present disclosure to the precise form disclosed. While specific embodiments of, and examples for, the present disclosure are described herein for illustrative purposes, various equivalent modifications are possible within the scope of the present disclosure, as those skilled in the art will recognize. The teachings of the present disclosure provided herein can be applied to other processing systems and methods. They may not be limited to the systems and methods described above.

The elements and acts of the various embodiments described above can be combined to provide further embodiments. These and other changes can be made in light of the above detailed description.

Provided above for the edification of those of ordinary skill in the art, and not as a limitation on the scope of the present disclosure, are detailed illustrations of a scheme for proactive roaming tests, discoveries of roaming partner services and discoveries of frauds in roaming using simulated roaming traffic. Numerous variations and modifications within the spirit of the present disclosure will of course occur to those of ordinary skill in the art in view of the example implementations that have been disclosed. For example, the present disclosure is described with respect to an implementation primarily with a non-VoLTE HPLMN. However, the present disclosure may also be effectively implemented with a LTE capable HPLMN but where the HPLMN and the VPLMN have not yet implemented IMS roaming according to GSMA guidelines etc., or any other network of common carrier telecommunications in which end users are normally configured to operate within a "home" network to which they normally subscribe, but have the capability of also operating on other neighboring networks, which may even be across international borders.

The examples under the system of present disclosure detailed in the illustrative examples contained herein are described using terms and constructs drawn largely from GSM mobile telephony infrastructure. However, use of these examples should not be interpreted as limiting the present disclosure to those media. The system and method can be of use and provided through any type of telecommunications medium, including without limitation: (i) any mobile telephony network including without limitation GSM, 3GSM, 3G, CDMA, WCDMA or GPRS, satellite phones or other mobile telephone networks or systems; (ii) any so-called WiFi based technology normally used in a home or subscribed network, but also configured for use on a visited or non-home or non-accustomed network, including apparatus not dedicated to telecommunications such as personal computers, Palm-type or Windows Mobile devices; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber identification (id) such as the eye2eye devices from Dlink; or telecommunications equipment meant for voice over IP communications such as those provided by Vonage or Packet8.

In describing certain aspects of the system or method under the present disclosure, this specification follows the path of a telecommunications call, from a calling party to a called party. For the avoidance of doubt, such a call can be a normal voice call, in which the subscriber telecommunications equipment is also capable of visual, audiovisual or motion-picture display. Alternatively, those devices or calls can be for text, video, pictures or other communicated data.

In the foregoing specification, certain aspects of the present disclosure have been described. However, one of ordinary skill in the art will appreciate that various modifications and changes can be made without departing from the scope of the present disclosure as set forth in the claims below. Accordingly, the specification and the figures are to be regarded in an illustrative rather than a restrictive sense, and all such modifications are intended to be included within the scope of present disclosure. The benefits, advantages, solutions to problems, and any element(s) that may cause any benefit, advantage, or solution to occur, or to become more pronounced, are not to be construed as a critical, required, or essential feature or element of any or all of the claims.

APPENDIX

A. Technical References

Note: Each of the below technical references is incorporated in the detailed description by reference in its entirety.

| | |
|---|---|
| Between the SGSN and the HLR | 3GPP TS 29.002 |
| Between MME and HSS | 3GPP TS 29.272 |
| InterWorking Function (IWF) between MAP based and Diameter based interfaces | 3GPP TS 29.305 |
| 3GPP System Architecture Evolution (SAE); Security architecture | 3GPP TS 33.401 |
| General Packet Radio Service (GPRS) enhancements for Evolved Universal Terrestrial Radio Access Network (E-UTRAN) access | 3GPP TS 23.401 |
| General Packet Radio Service (GPRS); Service description | 3GPP TS 23.060 |
| GPRS Tunnelling Protocol (GTP) across the Gn and Gp interface | 3GPP TS 29.060 |
| Evolved General Packet Radio Service (GPRS) Tunnelling Protocol for Control plane (GTPv2-C) | 3GPP TS 29.274 |
| Between the EPC based PLMN and the packet data network | 3GPP TS 29.061 |
| Between MME and MSC (SGs) | 3GPP TS 29.118 |
| IP Multimedia Subsystem (IMS); Stage 2 | 3GPP TS 23.228 |
| IP Multimedia (IM) Subsystem Cx and Dx interfaces | 3GPP TS 29.228 |
| Cx and Dx interfaces based on the Diameter protocol | 3GPP TS 29.229 |
| IP multimedia call control protocol based on Session Initiation Protocol (SIP) and Session Description Protocol (SDP) | 3GPP TS 24.229 |

B. Acronyms Used

| Acronym | Description |
|---|---|
| 3G | Third generation of mobile |
| ACM | ISUP Address Completion Message |
| AKA | Authentication and Key Agreement |
| ANM | ISUP Answer Message |
| ANSI-41 | American National Standards Institute #41 |
| ATI | Any Time Interrogation |
| BCSM | Basic Call State Model |
| BGW | Border GateWay |
| BSC | Base Station Controller |
| BOIC | Barring Outgoing International Calls |
| BOIC-EX-Home | Barring Outgoing International Calls except to home country |
| CAMEL | Customized Application for Mobile Enhanced Logic |
| CAP | Camel Application Part |
| CB | Call Barring |
| CC | Country Code |
| CDMA | Code Division Multiplexed Access |
| CdPA | Called Party Address |
| CDR | Call Detail Record |
| CF | Call Forwarding |
| CgPA | Calling Party Address |
| CIC | Circuit Identification Code |
| CK | Ciphering Key |
| CLI | Calling Line Identification |
| CSCF | Call Session Control Function |
| CSD | Circuit Switched Data |
| CSFB | Circuit Switched Fall Back |
| CSI | Camel Subscription Information |
| DPC | Destination Point Code |
| DSD | Delete Subscriber Data |
| DEA | Diameter Edge Agent |
| DRA | Diameter Routing Agent |
| DTMF | Dual Tone Multi-Frequency |
| ERB | CAP Event Report Basic call state model |
| EU | European Union |
| FPMN | Friendly Public Mobile Network |
| FTN | Forward-To-Number |
| GLR | Gateway Location Register |
| GGSN | Gateway GPRS Support Node |
| GMSC | Gateway MSC |
| GMSC-F | GMSC in FPMN |
| GMSC-H | GMSC in HPLMN 104 |
| GPRS | General Packet Radio System |
| GSM | Global System for Mobile |
| GSMA | GSM Association |
| GSM SSF | GSM Service Switching Function |
| GsmSCF | GSM Service Control Function |
| GT | Global Title |
| GTP | GPRS Tunnel Protocol |
| HLR | Home Location Register |
| HPLMN 104 | Home Public Land Mobile Network |
| HSS | Home Subscriber Server |
| GTT | Global Title Translation |
| I-CSCF | Interrogating Call Session Control Function |
| IAM | Initial Address Message |
| IDP | Initial DP IN/CAP message |
| IDD | International Direct Dial |
| IK | Integrity Key |
| IMS | Intelligent Multimedia sub System |
| IMSI | International Mobile Subscriber Identity |
| IMSI-H | HPLMN 104 IMSI |
| IN | Intelligent Network |
| INAP | Intelligent Network Application Part |
| INE | Interrogating Network Entity |
| IOT | Inter-Operator Tariff |
| IP | Internet Protocol |
| IPX | IP eXchange (network) |
| IREG | International Roaming Expert Group |
| IRS | International Revenue Share |
| ISC | International Service Carrier |
| ISD | MAP Insert Subscriber Data |
| ISG | International Signal Gateway |
| IST | Immediate Service Termination |
| ISTP | International STP |
| ISTP-F | ISTP connected to FPMN STP |
| ISTP-H | ISTP connected to HPLMN 104 STP |

-continued

| Acronym | Description |
| --- | --- |
| ISUP | ISDN User Part |
| ITPT | Inbound Test Profile Initiation |
| ITR | Inbound Traffic Redirection |
| IVR | Interactive Voice Response |
| KASME | Key Access Security Management Entity |
| LU | Location Update |
| LUP | MAP Location Update |
| MAP | Mobile Application Part |
| MCC | Mobile Country Code |
| MCC | Mobile Country Code |
| MD | Missing Data |
| ME | Mobile Equipment |
| MGT | Mobile Global Title |
| MMS | Multimedia Message Service |
| MMSC | Multimedia Message Service Center |
| MNC | Mobile Network Code |
| MNP | Mobile Number Portability |
| MO | Mobile Originated |
| MOS | Mean Opinion Score |
| MS | Mobile Station |
| MSC | Mobile Switching Center |
| MSISDN | Mobile Station International Subscriber Directory Number |
| MSRN | Mobile Station Roaming Number |
| MT | Mobile Terminated |
| MTP | Message Transfer Part |
| NDC | National Dialing Code |
| NP | Numbering Plan |
| NPI | Numbering Plan Indicator |
| NRTRDE | Near Real Time Roaming Data Exchange |
| O-CSI | Originating CAMEL Subscription Information |
| OCN | Original Called Number |
| ODB | Operator Determined Barring |
| OPC | Origination Point Code |
| OR | Optimal Routing |
| ORLCF | Optimal Routing for Late Call Forwarding |
| OTA | Over The Air |
| OTPI | Outbound Test Profile Initiation |
| P-CSCF | Proxy Call Session Control Function |
| PDP | Protocol Data Packet |
| PDN | Packet Data Network |
| PDU | Packet Data Unit |
| PRN | MAP Provide Roaming Number |
| PSI | MAP Provide Subscriber Information |
| QoS | Quality of Service |
| RAEX | Roaming Agreement Exchange |
| RI | Routing Indicator |
| RIS | Roaming Intelligence System |
| RDN | Redirecting Number |
| RNA | Roaming Not Allowed |
| RR | Roaming Restricted due to unsupported feature |
| RRB | CAP Request Report Basic call state model |
| RSD | Restore Data |
| RTP | Real-Time Transport Protocol |
| S-CSCF | Serving Call Session Control Function |
| SAI | Send Authentication Info |
| SC | Short Code |
| SCA | Smart Call Assistant |
| SCCP | Signal Connection Control part |
| SCP | Signaling Control Point |
| SF | System Failure |
| SG | Signaling Gateway |
| SGSN | Serving GPRS Support Node |
| SGSN-F | FPMN SGSN |
| SIM | Subscriber Identity Module |
| SIGTRAN | Signaling Transport Protocol |
| SME | Short Message Entity |
| SM-RP-UI | Short Message Relay Protocol User Information |
| SMS | Short Message Service |
| SMSC | Short Message Service Center |
| SMSC-F | FPMN SMSC |
| SMSC-H | HPLMN 104 SMSC |
| SN id | Serving Network identity |
| SoR | Steering of Roaming |
| SPC | Signal Point Code |
| SRI | MAP Send Routing Information |
| SRI-SM | MAP Send Routing Information For Short Message |

-continued

| Acronym | Description |
| --- | --- |
| SS | Supplementary Services |
| SS7 | Signaling System #7 |
| SSN | Sub System Number |
| SSP | Service Switch Point |
| STK | SIM Tool Kit Application |
| STP | Signal Transfer Point |
| STP-F | FPMN STP |
| STP-H | HPLMN 104 STP |
| TADIG | Transferred Account Data Interchange Group |
| TAP | Transferred Account Procedure |
| TCAP | Transaction Capabilities Application Part |
| VT-CSI | Visited Terminating CAMEL Service Information |
| TP | SMS Transport Protocol |
| TR | Traffic Redirection |
| TS | Traffic Steering |
| TT | Translation Type |
| UD | User Data |
| UDH | User Data Header |
| UDHI | User Data Header Indicator |
| URI | Uniform Resource Identifier |
| USSD | Unstructured Supplementary Service Data |
| VAS | Value Added Service |
| VIP | Very Important Person |
| VLR | Visited Location Register |
| VLR-F | FPMN VLR |
| VLR-H | HPLMN 104 VLR |
| VLR-V | VPLMN VLR |
| VMSC | Visited Mobile Switching Center |
| VoIP | Voice over IP |
| VoLTE | Voice over Long Term Evolution |
| VPLMN | Visited Public Land Mobile Network |
| ATI | Access Transport Information |
| UDV | Unexpected Data Value |
| USI | User Service Information |
| WAP | Wireless Access Protocol |

What is claimed is:

1. A method, comprising:

observing, at a gateway in a visited public land mobile network (VPLMN) of a mobile device of a subscriber, registration of the mobile device from a home PLMN (HPLMN) into a Long Term Evolution (LTE) access network of the VPLMN when the HPLMN is not capable of providing voice over LTE (VoLTE) services and the VPLMN provides the VoLTE services over the LTE access network;

updating, in response to the registration and at the gateway, location information of the mobile device in a home location register (HLR) of the HPLMN, wherein the location information of the mobile device corresponds to location information of the gateway in the VPLMN; and creating a local Intelligent Multimedia sub-System (IMS) subscription with telephony services in a local IMS of the VPLMN based on the updated location information.

2. The method of claim 1, wherein the local IMS subscription with telephony services is created in the local IMS according to information received from the HPLMN when the location of the mobile device has been updated in the HLR of the HPLMN.

3. The method of claim 1, wherein the telephony services in the local IMS are configured in the gateway.

4. The method of claim 1, wherein the gateway acts as a Diameter proxy to observe the registration of the mobile device from the HPLMN into the LTE access network of the VPLMN.

5. The method of claim 1, wherein the gateway probes Diameter connections with the HPLMN to observe the registration of the mobile device from the HPLMN into the LTE access network of the VPLMN.

6. The method of claim 1, further comprising:
registering, via the gateway, the subscriber of the mobile device in the local IMS in the VPLMN, in which a private identity of the subscriber comprises an International Mobile Subscriber Identity (IMSI);
registering, via the gateway, a public IMS identity for the subscriber in the form of a telephony Uniform Resource Identifier (URI), wherein digits of the public IMS identity correspond to those of a HPLMN Mobile Station International Subscriber Directory Number (HPLMN MSISDN);
registering, via the gateway, a public IMS identity for the subscriber in the form of a telephony URI, wherein the digits of the public IMS identity for the subscriber correspond to those of a E.164 telephone number selected from a number range allocated to the VPLMN; and
authenticating, via the gateway, the user of the mobile device within the local IMS in the VPLMN.

7. The method of claim 6, the method comprising:
authenticating, via the gateway, the subscriber of the mobile device from the HPLMN by means of IMS Authentication and Key Agreement (AKA) or SIP DIGEST.

8. The method of claim 6, the method further comprising:
receiving, via the gateway, a Diameter Multimedia-Auth-Request message;
transforming, via the gateway, the Diameter Multimedia-Auth-Request message into a Mobile Application Part (MAP) Send-Authentication-Information Request message;
receiving, via the gateway, 3G authentication vectors in a MAP Send-Authentication-Information Response message from the HLR in the HPLMN, in response to the MAP Send-Authentication-Information Request message; and
sending, via the gateway, a Diameter Multimedia-Auth-Answer message with translated authentication information.

9. The method of claim 1, the method further comprising:
delivering, via the gateway, one or more short messages sent to the HPLMN MSISDN to the mobile device of the user from the HPLMN when roaming in the VPLMN.

10. The method of claim 1, the method further comprising:
routing, via the gateway, a mobile terminating call to the HPLMN MSISDN to the mobile device when roaming in the VPLMN.

11. The method of claim 10, the method comprising:
receiving, via the gateway, a MAP Provide-Roaming-Number Request message for the mobile device; and
responding, via the gateway, with a MAP Provide-Roaming-Number Response message, in response to the MAP Provide-Roaming-Number Request message, wherein the MAP Provide-Roaming-Number Response message includes Mobile Station Roaming Number (MSRN) information for the subscriber and the MSRN includes digits of a telephony URI public identity, the digits being those of an E.164 telephone number selected from a number range allocated to the VPLMN.

12. A system, comprising a gateway configured to:
observe a registration of a mobile device of a subscriber from a home public land mobile network (HPLMN) into a Long Term Evolution (LTE) access network of a visited PLMN (VPLMN) when the HPLMN is not capable of providing voice over LTE (VoLTE) services and the VPLMN provides the VoLTE services over the LTE access network;
update, in response to the registration, location information of the mobile device in a home location register (HLR) of the HPLMN, wherein the location information of the mobile device corresponds to location information of the gateway in the VPLMN; and
create a local Intelligent Multimedia sub-System (IMS) subscription with telephony services in a local IMS in the VPLMN based on the updated location information.

13. The system of claim 12, wherein the local IMS subscription with telephony services is created in the local IMS, based on information received from the HPLMN when the location information of the mobile device has been updated in the HLR of the HPLMN.

14. The system of claim 12, wherein the telephony services in the local IMS are configured in the gateway.

15. The system of claim 12, wherein the gateway is implemented in the VPLMN.

16. The system of claim 12, wherein the gateway is implemented at a central location and serves multiple VPLMNs.

17. The system of claim 12, wherein the gateway acts as a Diameter proxy to observe the registration of the mobile device into the LTE access network of the VPLMN.

18. The system of claim 12, wherein the gateway probes Diameter connections with the HPLMN to observe the registration of the mobile device into the LTE access network of the VPLMN.

19. The system of claim 12, wherein the gateway is further configured to:
register the mobile device from the HPLMN in the local IMS in the VPLMN;
register a public IMS identity of the subscriber in the form of a telephony URI, wherein digits of the public IMS identity correspond to those of the HPLMN Mobile Station International Subscriber Directory Number (MSISDN);
register a public IMS identity of the subscriber in the form of a telephony URI, wherein the digits of the public IMS identity correspond to those of a E.164 telephone number selected from a number range allocated to the VPLMN; and
authenticate the subscriber of the mobile device from the HPLMN within the local IMS in the VPLMN.

20. The system of claim 19, wherein the gateway is further configured to:
authenticate the subscriber of the mobile device from the HPLMN by means of IMS Authentication and Key Agreement (AKA) or SIP DIGEST.

21. The system of claim 19, wherein the gateway is further configured to:
receive a Diameter Multimedia-Auth-Request message;
transform the Diameter Multimedia-Auth-Request message into a Mobile Application Part (MAP) Send-Authentication-Information Request message which is to be sent to the HLR;
receive 3G authentication vectors in the MAP Send-Authentication-Information Response message from the HLR in the HPLMN; and
send a Diameter Multimedia-Auth-Answer message with translated authentication information in response to the Diameter Multimedia-Auth-Request message.

22. The system of claim 12, wherein the gateway is further configured to:

deliver one or more short messages sent to the HPLMN MSISDN to the mobile device of the subscriber from the HPLMN when roaming in the VPLMN.

23. The system of claim 12, wherein the gateway is further configured to:
route terminating calls to the HPLMN MSISDN to the mobile device of the subscriber from the HPLMN when roaming in the VPLMN.

24. The system of claim 12, wherein the gateway is further configured to:
receive a MAP Provide-Routing-Number Request message; and
respond with a MAP Provide-Routing-Number Response message, wherein the MAP Provide-Routing-Number Response message includes the Mobile Subscriber Roaming Number (MSRN) and the MSRN includes digits of a telephony Uniform Resource Identifier (URI) public identity, the digits being those of an E.164 telephone number selected from a number range allocated to the VPLMN.

25. A computer program product, comprising a non-transitory computer readable medium comprising:
code for observing, at a gateway in a visited public land mobile network (VPLMN) of a mobile device of a subscriber, registration of the mobile device from a home PLMN (HPLMN) into a Long Term Evolution (LTE) access network of the VPLMN when the HPLMN is not capable of providing voice over LTE (VoLTE) services and the VPLMN provides the VoLTE services over the LTE access network;
code for updating, in response to the registration and at the gateway, location information of the mobile device in a home location register (HLR) of the HPLMN, wherein the location information of the mobile device corresponds to location information of the gateway in the VPLMN; and
code for creating a local Intelligent Multimedia subSystem (IMS) subscription with telephony services in a local IMS in the VPLMN based on the updated location information.

* * * * *